(12) United States Patent
Wang et al.

(10) Patent No.: US 11,910,406 B2
(45) Date of Patent: *Feb. 20, 2024

(54) WIRELESS COMMUNICATION WITH DOWNLINK CONTROL INFORMATION HAVING A SEMI PERSISTENT SCHEDULING ACTIVATION/DEACTIVATION FIELD

(71) Applicant: Panasonic Intellectual Property Corporation of America, Torrance, CA (US)

(72) Inventors: Lilei Wang, Beijing (CN); Sujuan Feng, Hessen (DE); Alexander Golitschek Edler Von Elbwart, Hessen (DE); Prateek Basu Mallick, Hessen (DE); Masayuki Hoshino, Chiba (JP); Joachim Loehr, Hessen (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,045

(22) Filed: Apr. 14, 2023

(65) Prior Publication Data
US 2023/0254876 A1    Aug. 10, 2023

Related U.S. Application Data

(63) Continuation of application No. 17/037,508, filed on Sep. 29, 2020, now Pat. No. 11,678,338, which is a
(Continued)

(51) Int. Cl.
*H04W 72/23*    (2023.01)
*H04W 4/40*    (2018.01)
(Continued)

(52) U.S. Cl.
CPC ........... *H04W 72/23* (2023.01); *H04L 1/0061* (2013.01); *H04W 4/40* (2018.02); *H04W 76/27* (2018.02); *H04W 80/02* (2013.01)

(58) Field of Classification Search
CPC ..... H04W 72/042; H04W 4/40; H04W 76/27; H04W 72/1289; H04W 80/02;
(Continued)

(56) References Cited

U.S. PATENT DOCUMENTS 9,451,610 B2    9/2016    Ohta et al.
10,356,803 B2   7/2019    Kim et al.
(Continued)

FOREIGN PATENT DOCUMENTS

EP    2549817 A1    1/2013
EP    2922357 A1    9/2015
(Continued)

OTHER PUBLICATIONS

Australian Office Action, dated Jun. 9, 2020, for Australian Patent Application No. 2016390529, 4 pages.
(Continued)

*Primary Examiner* — Rushil P. Sampat
(74) *Attorney, Agent, or Firm* — Seed IP Law Group LLP

(57) ABSTRACT

Provided are an eNB, a UE and wireless communication methods. The eNB, in an embodiment, includes circuitry operative to fill a SPS activation/deactivation field in a DCI with a predetermined pattern of bits; and a transmitter operative to transmit the DCI to a first UE for the first UE to start periodically transmitting signals to a second UE or stop periodically transmitting signals to the second UE based on the SPS activation/deactivation field. The DCI is in a SPS format formed by adopting part or all bits of at least one field of DCI format 5 as the SPS activation/deactivation field, and information supposed to be transmitted in the at least one field is indicated with the assistance of or by RRC or MAC signaling.

6 Claims, 4 Drawing Sheets

Related U.S. Application Data continuation of application No. 16/069,873, filed as application No. PCT/CN2016/072665 on Jan. 29, 2016, now Pat. No. 10,827,475.

(51) Int. Cl.
*H04W 76/27* (2018.01)
*H04L 1/00* (2006.01)
*H04W 80/02* (2009.01)

(58) Field of Classification Search
CPC ... H04L 1/0061; H04L 1/0038; H04L 5/0078; H04L 5/0053
See application file for complete search history.

(56) References Cited

U.S. PATENT DOCUMENTS

| | | | |
|---|---|---|---|
| 10,827,475 | B2 | 11/2020 | Wang et al. |
| 11,337,202 | B2 | 5/2022 | Chen et al. |
| 2010/0202389 | A1 | 8/2010 | Cai et al. |
| 2011/0085458 | A1 | 4/2011 | Montojo et al. |
| 2013/0077569 | A1 | 3/2013 | Nam et al. |
| 2013/0201964 | A1 | 8/2013 | Kim et al. |
| 2014/0023008 | A1 | 1/2014 | Ahn et al. |
| 2014/0105164 | A1 | 4/2014 | Moulsley et al. |
| 2014/0233480 | A1 | 8/2014 | Kim et al. |
| 2015/0049694 | A1* | 2/2015 | Choi ............... H04W 72/23 370/329 |
| 2015/0063179 | A1 | 3/2015 | Yang et al. |
| 2015/0289268 | A1 | 10/2015 | Ohta et al. |
| 2016/0353478 | A1 | 12/2016 | Kim |
| 2016/0373915 | A1 | 12/2016 | Kim et al. |
| 2017/0079065 | A1* | 3/2017 | Lyu ............... H04W 72/23 |
| 2017/0230956 | A1* | 8/2017 | Kim ............... H04L 5/0032 |
| 2017/0230995 | A1 | 8/2017 | Kim et al. |
| 2018/0070367 | A1 | 3/2018 | Fujishiro et al. |
| 2018/0184439 | A1 | 6/2018 | Lee et al. |
| 2019/0029006 | A1 | 1/2019 | Wang et al. |

FOREIGN PATENT DOCUMENTS

| | | |
|---|---|---|
| JP | 2012065126 A | 3/2012 |
| JP | 2014531824 A | 11/2014 |
| WO | WO 2014097357 A1 | 6/2014 |
| WO | WO 2015017983 A1 | 2/2015 |
| WO | WO 2015126114 A1 | 8/2015 |
| WO | WO 2016021902 A1 | 2/2016 |
| WO | WO 2017128274 A1 | 8/2017 |

OTHER PUBLICATIONS

English Translation of Chinese Office Action dated Dec. 22, 2020 for the related Chinese Patent Application No. 201680078455.2, 8 pages.

Extended European Search Report dated Oct. 18, 2022 for the related European Patent Application No. 16887161.4, 11 pages.

Huawei et al., "DCI for D2D communication mode 1," R1-142840, Agenda Item: 7.2.3.2.2, 3GPP TSG RAN WG1 Meeting #78, Dresden, Germany, Aug. 18-22, 2014, 4 pages.

Huawei, "Multiple antenna for PUCCH," R1-100260, Agenda Item: 7.3.2, 3GPP TSG RAN WG1#59bis, Valencia, Spain, Jan. 18-22, 2010, 4 pages.

InterDigital Communications, "Multiple concurrent destination within a scheduling period," R2-156699, Agenda Item: 7.5.4, 3GPP TSG-RAN WG2 #92, Anaheim, California, USA, Nov. 15-22, 2015, 3 pages.

International Search Report, dated Oct. 27, 2016, for PCT Application No. PCT/CN2016/072665, 2 pages.

U.S. Appl. No. 62/182,732 (Year: 2015).

Rapporteur (CMCC), "Summary of email discussion on remaining details of the Downlink 9 control signalling for Dual-layer Beamforming," R1-094828, Agenda item: 6.4.2, 3GPP TSG-RAN WG1 #59, Korea, Jeju, Nov. 9-13, 2009, 5 pages.

\* cited by examiner

WIRELESS COMMUNICATION WITH DOWNLINK CONTROL INFORMATION HAVING A SEMI PERSISTENT SCHEDULING ACTIVATION/DEACTIVATION FIELD

BACKGROUND

1. Technical Field

The present disclosure relates to the field of wireless communication, and in particular, to an eNode B (eNB), a user equipment (UE), and wireless communication methods for semi-static (persistent) scheduling (SPS) activation/deactivation.

2. Description of the Related Art

V2X means communication between vehicles (V2V), communication between vehicle and pedestrian (V2P), communication between vehicle and infrastructure (V2I) or communication between vehicle and network (V2N). It is currently being discussed in 3GPP RAN1, and one starting point to study is based on LTE Rel.12/Rel.13 device to device (D2D) framework.

SUMMARY

One non-limiting and exemplary embodiment provides an approach to facilitate SPS activation/deactivation in V2X or D2D.

In a first general aspect of the present disclosure, there is provided an eNode B (eNB) comprising: circuitry operative to fill a semi-static (persistent) scheduling (SPS) activation/deactivation field in a downlink control information (DCI) with a predetermined pattern of bits; and a transmitter operative to transmit the DCI to a first user equipment (UE) for the first UE to start periodically transmitting signals to a second UE or stop periodically transmitting signals to the second UE based on the SPS activation/deactivation field, wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

In a second general aspect of the present disclosure, there is provided an eNode B (eNB) comprising: circuitry operative to scramble cyclic redundancy check (CRC) of a downlink control information (DCI) with a radio network temporary identity (RNTI); and a transmitter operative to transmit the DCI to a first user equipment (UE) for the first UE to determine whether to transmit a signal to a second UE one time, start periodically transmitting signals to the second UE or stop periodically transmitting signals to the second UE based on only the RNTI, wherein the DCI is in DCI format 5.

In a third general aspect of the present disclosure, there is provided an eNode B (eNB) comprising: circuitry operative to fill a semi-static (persistent) scheduling (SPS) activation/deactivation field in a first downlink control information (DCI) with a predetermined pattern of bits; and a transmitter operative to transmit the first DCI to a first user equipment (UE) for the first UE to transmit a signal to a second UE one time, start periodically transmitting signals to the second UE or stop periodically transmitting signals to the second UE based on the SPS activation/deactivation field, wherein the first DCI is in a format formed by additionally adding the SPS activation/deactivation field to DCI format 5; the transmitter is also operative to transmit a second DCI to the first UE for the first UE to transmit a signal to the eNB; and the second DCI is in DCI format 0/1A with all legacy fields being enabled or in a format formed by additionally adding the same field as the one added to the DCI format 5 to the DCI format 0/1A, such that the size of the first DCI is the same as that of the second DCI.

In a fourth general aspect of the present disclosure, there is provided a user equipment (UE) comprising: a receiver operative to receive a downlink control information (DCI) transmitted from an eNode B (eNB); a transmitter operative to start periodically transmitting signals to another UE or stop periodically transmitting signals to said another UE based on a SPS activation/deactivation field in the DCI, wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

In a fifth general aspect of the present disclosure, there is provided a user equipment (UE) comprising: a receiver operative to receive a downlink control information (DCI) transmitted from an eNode B (eNB); and circuitry operative to determine whether to transmit a signal to another UE one time, start periodically transmitting signals to said another UE or stop periodically transmitting signals to said another UE based on only the radio network temporary identity (RNTI) scrambling cyclic redundancy check (CRC) of the DCI; wherein the DCI is in DCI format 5.

In a sixth general aspect of the present disclosure, there is provided a user equipment (UE) comprising: a receiver operative to receive a first downlink control information (DCI) transmitted from an eNode B (eNB); and a transmitter operative to transmit a signal to another UE one time, start periodically transmitting signals to said another UE or stop periodically transmitting signals to said another UE based on a SPS activation/deactivation field in the first DCI, wherein the first DCI is in a format formed by additionally adding the SPS activation/deactivation field to DCI format 5; the receiver is also operative to receive a second DCI transmitted from the eNB for the transmitter to transmit a signal to the eNB; and the second DCI is in DCI format 0/1A with all legacy fields being enabled or in a format formed by additionally adding the same field as the one added to the DCI format 5 to the DCI format 0/1A, such that the size of the first DCI is the same as that of the second DCI.

In a seventh general aspect of the present disclosure, there is provided a wireless communication method performed by an eNode B (eNB), comprising: filling a semi-static (persistent) scheduling (SPS) activation/deactivation field in a downlink control information (DCI) with a predetermined pattern of bits; and transmitting the DCI to a first user equipment (UE) for the first UE to start periodically transmitting signals to a second UE or stop periodically transmitting signals to the second UE based on the SPS activation/deactivation field, wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

In an eighth general aspect of the present disclosure, there is provided a wireless communication method performed by an eNode B (eNB), comprising: scrambling cyclic redundancy check (CRC) of a downlink control information (DCI) with a radio network temporary identity (RNTI); and transmitting the DCI to a first user equipment (UE) for the first UE to determine whether to transmit a signal to a second UE one time, start periodically transmitting signals to the second UE or stop periodically transmitting signals to the second UE based on only the RNTI, wherein the DCI is in DCI format 5.

In a ninth general aspect of the present disclosure, there is provided a wireless communication method performed by an eNode B (eNB), comprising: filling a semi-static (persistent) scheduling (SPS) activation/deactivation field in a first downlink control information (DCI) with a predetermined pattern of bits; transmitting the first DCI to a first user equipment (UE) for the first UE to transmit a signal to a second UE one time, start periodically transmitting signals to the second UE or stop periodically transmitting signals to the second UE based on the SPS activation/deactivation field, wherein the first DCI is in a format formed by additionally adding the SPS activation/deactivation field to DCI format 5; and transmitting a second DCI to the first UE for the first UE to transmit a signal to the eNB, wherein the second DCI is in DCI format 0/1A with all legacy fields being enabled or in a format formed by additionally adding the same field as the one added to the DCI format 5 to the DCI format 0/1A, such that the size of the first DCI is the same as that of the second DCI.

In a tenth general aspect of the present disclosure, there is provided a wireless communication method performed by a user equipment (UE), comprising: receiving a downlink control information (DCI) transmitted from an eNode B (eNB); starting periodically transmitting signals to another UE or stopping periodically transmitting signals to said another UE based on a SPS activation/deactivation field in the DCI, wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

In an eleventh general aspect of the present disclosure, there is provided a wireless communication method performed by a user equipment (UE), comprising: receiving a downlink control information (DCI) transmitted from an eNode B (eNB); and determining whether to transmit a signal to another UE one time, start periodically transmitting signals to said another UE or stop periodically transmitting signals to said another UE based on only the radio network temporary identity (RNTI) scrambling cyclic redundancy check (CRC) of the DCI; wherein the DCI is in DCI format 5.

In a twelfth general aspect of the present disclosure, there is provided a wireless communication method performed by a user equipment (UE), comprising: receiving a first downlink control information (DCI) transmitted from an eNode B (eNB); transmitting a signal to another UE one time, starting periodically transmitting signals to said another UE or stopping periodically transmitting signals to said another UE based on a SPS activation/deactivation field in the first DCI, wherein the first DCI is in a format formed by additionally adding the SPS activation/deactivation field to DCI format 5; and receiving a second DCI transmitted from the eNB for the transmitter to transmit a signal to the eNB, wherein the second DCI is in DCI format 0/1A with all legacy fields being enabled or in a format formed by additionally adding the same field as the one added to the DCI format 5 to the DCI format 0/1A, such that the size of the first DCI is the same as that of the second DCI.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
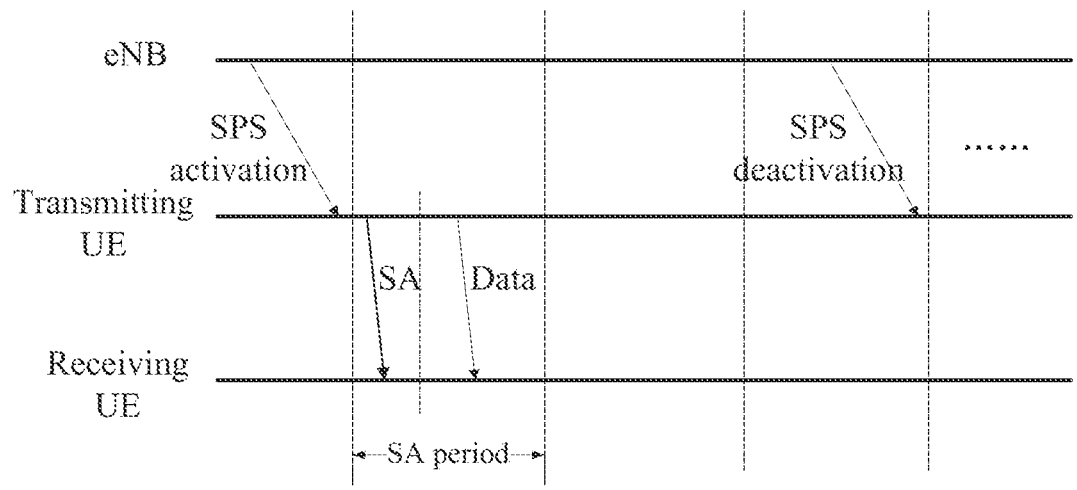
FIG. 1 schematically illustrates exemplary SPS transmission in D2D or V2X.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In D2D or V2X, one resource allocation mode is based on eNB scheduling. In this mode, an eNB sends a DCI to a transmitting UE for resource allocation, and the transmitting UE transmits signals to a receiving UE based on the resource allocation indicated by the DCI. However, the UE density in a D2D or V2X group can be high, and thus large signaling overhead would be caused in the above resource allocation process. Under this consideration, SPS can be a good resource allocation mechanism to save control overhead. FIG. 1 schematically illustrates exemplary SPS transmission in D2D or V2X.

The eNB first sends SPS activation signaling to the transmitting UE, and then the transmitting UE periodically transmits signals to the receiving UE after receiving the SPS activation signaling. The signals can be transmitted in scheduling assignment (SA) periods, and the signals can comprise both SA and data (as shown in FIG. 1) or only data. If the eNB decides to stop the periodical transmission, it sends SPS deactivation signaling to the transmitting UE, and the transmitting UE stops the periodical transmission, that is, not to start next period, when it receives the SPS deactivation signaling.

In the present disclosure, approaches for SPS activation/deactivation in D2D or V2X are proposed. It is noted that the proposals are applicable to all kinds of D2D or V2X communication. The UE herein refers to any terminal device suitable for D2D or V2X, for example, a cell phone, a pad, any wireless communication device installed in a vehicle, etc., and the eNB herein refers to any base station suitable for resource allocation in D2D or V2X.

Figure 2:
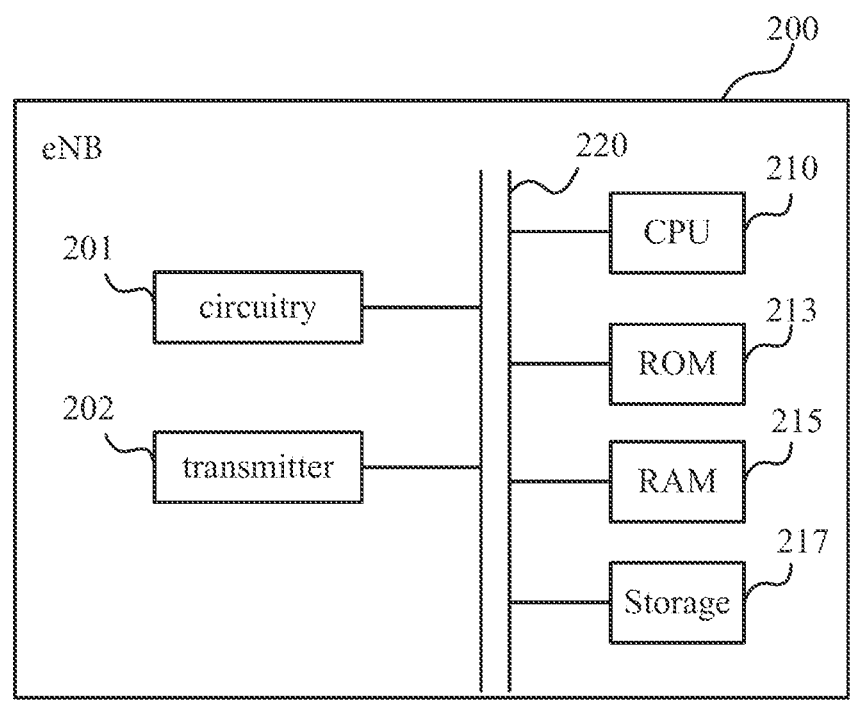
FIG. 2 schematically illustrates a block diagram of an eNB according to an embodiment of the present disclosure.

In an embodiment of the present disclosure, there is provided an eNB 200 as shown in FIG. 2 which schematically illustrates a block diagram of eNB 200 according to an embodiment of the present disclosure. The eNB 200 can comprise circuitry 201 which is operative to fill a SPS activation/deactivation field in a DCI with a predetermined pattern of bits; and a transmitter 202 which is operative to transmit the DCI to a first UE for the first UE to start periodically transmitting signals to a second UE or stop periodically transmitting signals to the second UE based on the SPS activation/deactivation field, wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

In the embodiment, the eNB 200 transmits a DCI with a SPS activation/deactivation field to activate or deactivate the SPS transmission for the first UE (transmitting UE) to the second (receiving UE). Here, the SPS activation/deactivation field is a field for indicating SPS transmission activation or stop SPS transmission deactivation, and can be filled with a predetermined pattern of bits, for example, all bits can be filled with "0" or "1", or some bits are filled with "0" and the others are filled with "1". When the transmitting UE receives the DCI and detects the SPS activation/deactivation field, the transmitting UE activates SPS transmission or deactivates the SPS transmission that has be started based on the SPS activation/deactivation field. For example, when the transmitting UE detects the SPS activation/deactivation field with all bits being "0", the transmitting UE activates the SPS transmission to a receiving UE; and when the transmitting UE detects the SPS activation/deactivation field with all bits being "1", the transmitting UE deactivates the SPS transmission to the receiving UE.

In the embodiment, the above DCI can be based on DCI format 5 specified in 3GPP TS 36.212 with some fields being modified. Specifically, the DCI can be in a format (referred to as SPS format herein) formed by adopting part or all bits of at least one field of DCI format 5 as the SPS activation/deactivation field, for example, the SPS activation/deactivation field can have 6 or more bits selected from the DCI format 5. In LTE Rel.12/13, since DCI format 5 and DCI format 0/1A specified in 3GPP TS 36.212 are of the same size and share the same search space, the above SPS format by reusing some or all bits in DCI format 5 can have the same size with DCI format 5 and DCI format 0/1A and thus blind decoding times will not be increased.

The reason why some or even all fields in DCI format 5 can be reused for SPS activation/deactivation is that there is potentially no need for the eNB to dynamically indicate some or even any field from SPS point of view in D2D or V2X. Therefore, information supposed to be transmitted in the reused field can be indicated by RRC or MAC signaling or with the assistance of RRC or MAC signaling. For example, since the eNB sends the DCI very infrequently in SPS, quick adaptation on resource allocation (e.g., time resource pattern) is impossible. Therefore, the time resource pattern can be indicated by RRC or MAC signaling; or the time resource pattern can be indicated with the assistance of RRC or MAC signaling, for example, the eNB can configure a set of time resource patterns via RRC or MAC signaling, and only a few bits in the DCI are used for indicating certain time resource pattern in the configured set for SPS transmission. In such a way, several bits in the field of "time resource pattern" in the DCI format 5 can be saved for SPS activation/deactivation.

In an example, a different radio network temporary identity (RNTI) (referred to as SPS RNTI herein) from the RNTI for the DCI format 5 can be applied to scramble cyclic redundancy check (CRC) of the DCI in the SPS format in order to facilitate identifying the DCI in the SPS format and increase the robustness of SPS activation/deactivation identification. In another example, the RNTI for scrambling CRC of the DCI in the SPS format can be the same as that for scrambling CRC of a DCI in the DCI format 5 when the number of bits for identifying SPS activation/deactivation in the DCI is large enough to ensure the robustness of SPS activation/deactivation identification, in particular when all bits of all fields in the DCI format 5 are adopted as the SPS activation/deactivation field. As mentioned in the above, in D2D or V2X, there may be no need for the eNB to dynamically indicate any field from SPS point of view. In view of this, all relevant information on SPS can indicated in RRC or MAC signaling and DCI is only used for SPS activation/deactivation. In this situation, the SPS RNTI may not be needed since there are lots of bits used for identifying SPS activation/deactivation. It is noted that, in a legacy system rather than D2D or V2X, some information like "HARQ-ACK resource offset" and "Flag for format0/format1A differentiation" still needs to be indicated in a DCI as the eNB needs to dynamically control ACK resource as well as DCI format type (0 or 1A).

Tables 1-5 illustrate several examples of the bits in the DCI format 5 that are reused for SPS activation/deactivation in V2X or D2D.

TABLE 1

| DCI format 5 | |
| --- | --- |
| Special fields for V2X SPS activation | |
| Resource for PSCCH | All bits are set to "0" |
| TPC command for PSCCH and PSSCH | All bits are set to "0" |
| Frequency hopping flag | All bits are set to "0" |
| Resource block assignment and hopping resource allocation | All bits are set to "0" |
| Time resource pattern | All bits are set to "0" |

TABLE 1-continued

| DCI format 5 | |
|---|---|
| Special fields for V2X SPS deactivation | |
| Resource for PSCCH | All bits are set to "1" |
| TPC command for PSCCH and PSSCH | All bits are set to "1" |
| All bits are set to "1" | All bits are set to "1" |
| Resource block assignment and hopping resource allocation | All bits are set to "1" |
| Time resource pattern | All bits are set to "1" |

Table 1 illustrates that all bits in all fields in DCI format 5 are used for SPS activation/deactivation in V2X or D2D. For example, all bits being set to "0" means SPS activation and all bits being set to "1" means SPS deactivation.

TABLE 2

| DCI format 5 | |
|---|---|
| Special fields for V2X SPS activation | |
| Resource for PSCCH | N/A |
| TPC command for PSCCH and PSSCH | N/A |
| Frequency hopping flag | N/A |
| Resource block assignment and hopping resource allocation | N/A |
| Time resource pattern | MSB 6 bits are set to "000000" |
| Special fields for V2X SPS deactivation | |
| Resource for PSCCH | N/A |
| TPC command for PSCCH and PSSCH | N/A |
| Frequency hopping flag | N/A |
| Resource block assignment and hopping resource allocation | N/A |
| Time resource pattern | MSB 6 bits are set to "111111" |

Table 2 illustrates that most bits (MSB 6 bits) in the "time resource pattern" field of DCI format 5 are used for SPS activation/deactivation in V2X or D2D.

TABLE 3

| DCI format 5 | |
|---|---|
| Special fields for V2X SPS activation | |
| Resource for PSCCH | N/A |
| TPC command for PSCCH and PSSCH | Set to "0" |
| Frequency hopping flag | Set to "0" |
| Resource block assignment and hopping resource allocation | N/A |
| Time resource pattern | MSB 4 bits are set to "0000" |
| Special fields for V2X SPS deactivation | |
| Resource for PSCCH | N/A |
| TPC command for PSCCH and PSSCH | Set to "1" |
| Frequency hopping flag | Set to "1" |
| Resource block assignment and hopping resource allocation | N/A |
| Time resource pattern | MSB 4 bits are set to "1111" |

Table 3 illustrates that some bits in the "time resource pattern" field, the "TPC command for PSCCH and PSSCH" field and the "Frequency hopping flag" field are used for SPS activation/deactivation in V2X or D2D.

TABLE 4

| DCI format 5 | |
|---|---|
| Special fields for V2X SPS activation | |
| Resource for PSCCH | MSB 3 bits are set to "0" |
| TPC command for PSCCH and PSSCH | N/A |
| Frequency hopping flag | N/A |
| Resource block assignment and hopping resource allocation | MSB 3 bits are set to "0" |
| Time resource pattern | N/A |
| Special fields for V2X SPS deactivation | |
| Resource for PSCCH | MSB 3 bits are set to "1" |
| TPC command for PSCCH and PSSCH | N/A |
| All bits are set to "1" | N/A |
| Resource block assignment and hopping resource allocation | MSB 3 bits are set to "1" |
| Time resource pattern | N/A |

Table 4 illustrates that some bits in the "Resource for PSCCH" field and the "Resource block assignment and hopping resource allocation" field are used for SPS activation/deactivation in V2X or D2D. This example is particularly applicable to the sub-channel concept mentioned in 3GPP RAN1 (refer to RAN1 contribution R1-156607). When the sub-channel concept is applied, the "Resource for PSCCH" field and the "Resource block assignment and hopping resource allocation" field can be simplified as the basic allocation unit is sub-channel which consists of multiple PRBs and PSCCH is located in part of PRBs in each sub-channel. Only part bits in those fields are used for sub-channel indication, and the others can be used for SPS activation/deactivation in V2X or D2D.

TABLE 5

| DCI format 5 | |
|---|---|
| Special fields for V2X SPS activation | |
| Resource for PSCCH | N/A |
| TPC command for PSCCH and PSSCH | N/A |
| Frequency hopping flag | N/A |
| Resource block assignment and hopping resource allocation | N/A |
| Time resource pattern | MSB 6 bits are set to "000000" |
| Special fields for V2X SPS deactivation | |
| Resource for PSCCH | All bits are set to "1" |
| TPC command for PSCCH and PSSCH | All bits are set to "1" |
| All bits are set to "1" | All bits are set to "1" |
| Resource block assignment and hopping resource allocation | All bits are set to "1" |
| Time resource pattern | All bits are set to "1" |

Table 5 illustrates that activation and deactivation can use different fields, in particular, MSB 6 bits in the "time resource pattern" field are used for SPS activation, and all fields are used for SPS deactivation.

In addition, as shown in FIG. 2, the eNB 200 according to the present disclosure may optionally include a CPU (Central Processing Unit) 210 for executing related programs to process various data and control operations of respective units in the eNB 200, a ROM (Read Only Memory) 213 for storing various programs required for performing various process and control by the CPU 210, a RAM (Random Access Memory) 215 for storing intermediate data temporarily produced in the procedure of process and control by the CPU 210, and/or a storage unit 217 for storing various programs, data and so on. The above circuitry 201, and transmitter 202, CPU 210, ROM 213, RAM 215 and/or storage unit 217 etc. may be interconnected via data and/or command bus 220 and transfer signals between one another.

Respective components as described above do not limit the scope of the present disclosure. According to one implementation of the disclosure, the functions of the above circuitry 201 and transmitter 202 may be implemented by hardware, and the above CPU 210, ROM 213, RAM 215 and/or storage unit 217 may not be necessary. Alternatively, the functions of the above circuitry 201 and transmitter 202 may also be implemented by functional software in combination with the above CPU 210, ROM 213, RAM 215 and/or storage unit 217 etc.

The eNB 200 may also comprise a receiver operative to receive signals from the first UE. In an embodiment, the receiver does not receive sidelink buffer status report (BSR) message or scheduling request (SR) for sidelink from the first UE when the first UE periodically transmits signals to the second UE, i.e. during SPS transmission.

Figure 3:
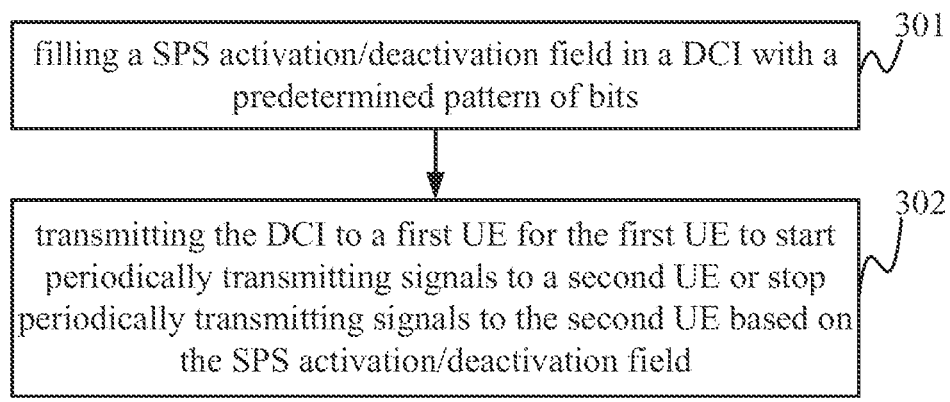
FIG. 3 illustrates a flowchart of a wireless communication method performed by an eNB according to an embodiment of the present disclosure.

FIG. 3 illustrates a flowchart of a wireless communication method 300 performed by an eNB (e.g. the eNB 200) according to an embodiment of the present disclosure. The wireless communication method 300 can comprise a step 301 of filling a SPS activation/deactivation field in a DCI with a predetermined pattern of bits, and a step 302 of transmitting the DCI to a first UE for the first UE to start periodically transmitting signals to a second UE or stop periodically transmitting signals to the second UE based on the SPS activation/deactivation field, wherein the DCI is in a SPS format formed by adopting part or all bits of at least one field of DCI format 5 as the SPS activation/deactivation field, and information supposed to be transmitted in the at least one field is indicated with the assistance of or by RRC or MAC signaling. The details and benefits described in the above for eNB 200 can also be applied to the wireless communication method 300.

Accordingly, embodiments of the present disclosure provide a UE as the transmitting UE and a wireless communication method performed by the transmitting UE.

Figure 4:
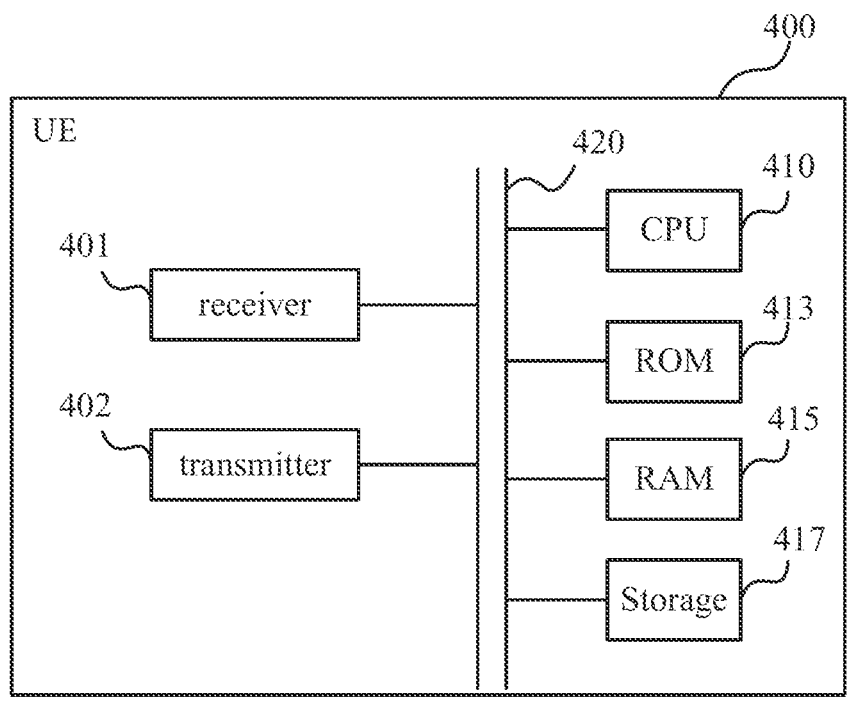
FIG. 4 schematically illustrates a block diagram of a UE according to an embodiment of the present disclosure.

FIG. 4 schematically illustrates a block diagram of a UE 400 as the transmitting UE according to an embodiment of the present disclosure. The UE 400 can comprise a receiver 401 operative to receive a DCI transmitted from an eNB, and a transmitter 402 operative to start periodically transmitting signals to another UE (receiving UE) or stop periodically transmitting signals to said another UE based on a SPS activation/deactivation field in the DCI, wherein the DCI is in a SPS format formed by adopting part or all bits of at least one field of DCI format 5 as the SPS activation/deactivation field, and information supposed to be transmitted in the at least one field is indicated with the assistance of or by RRC or MAC signaling. Optionally, the transmitter 402 does not transmit sidelink BSR message or SR for sidelink to the eNB when periodically transmitting signals to the receiving UE.

The UE 400 according to the present disclosure may optionally include a CPU (Central Processing Unit) 410 for executing related programs to process various data and control operations of respective units in the UE 400, a ROM (Read Only Memory) 413 for storing various programs required for performing various process and control by the CPU 410, a RAM (Random Access Memory) 415 for storing intermediate data temporarily produced in the procedure of process and control by the CPU 410, and/or a storage unit 417 for storing various programs, data and so on. The above receiver 401, transmitter 402, CPU 410, ROM 413, RAM 415 and/or storage unit 417 etc. may be interconnected via data and/or command bus 420 and transfer signals between one another.

Respective components as described above do not limit the scope of the present disclosure. According to one implementation of the disclosure, the functions of the above receiver 401 and transmitter 402 may be implemented by hardware, and the above CPU 410, ROM 413, RAM 415 and/or storage unit 417 may not be necessary. Alternatively, the functions of the above receiver 401 and transmitter 402 may also be implemented by functional software in combination with the above CPU 410, ROM 413, RAM 415 and/or storage unit 417 etc.

Figure 5:
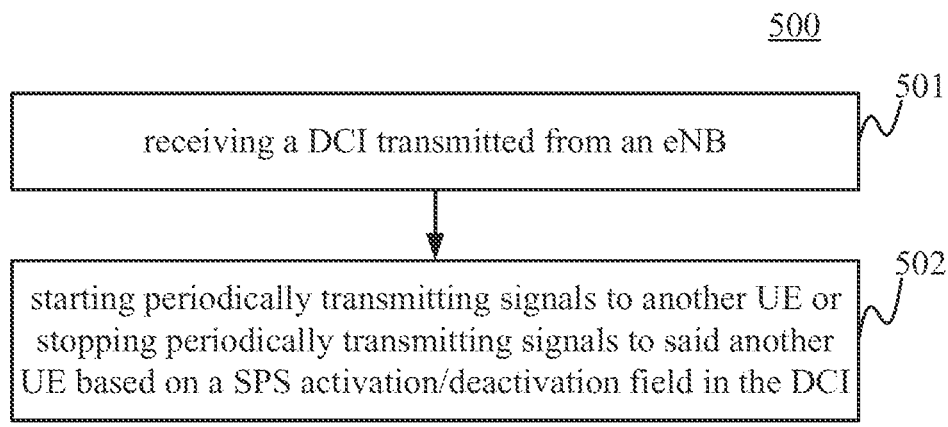
FIG. 5 illustrates a flowchart of a wireless communication method performed by a UE according to an embodiment of the present disclosure.

FIG. 5 illustrates a flowchart of a wireless communication method 500 performed by a UE (e.g., the transmitting UE 400) according to an embodiment of the present disclosure. The wireless communication method 500 can comprise a step 501 of receiving a DCI transmitted from an eNB, and a step 502 of starting periodically transmitting signals to another UE (receiving UE) or stopping periodically transmitting signals to said another UE based on a SPS activation/deactivation field in the DCI, wherein the DCI is in a SPS format formed by adopting part or all bits of at least one field of DCI format 5 as the SPS activation/deactivation field, and information supposed to be transmitted in the at least one field is indicated with the assistance of or by RRC or MAC signaling.

It is noted that the details and benefits described in the above for the eNB side can also be applied to the UE side, unless the context indicates otherwise.

In another embodiment, SPS activation/deactivation can be triggered purely by RNTI, and there is no special field used for SPS activation/deactivation. For example, SPS RNTI 1 is used for SPS activation, SPS RNTI 2 is used for SPS deactivation, and another RNTI is used for non-SPS transmission (one time transmission). Therefore, the UE receiving a DCI can determine whether to activate SPS transmission, deactivate SPS transmission or perform one-time transmission based on the RNTI scrambling the CRC of the DCI.

Figure 6:
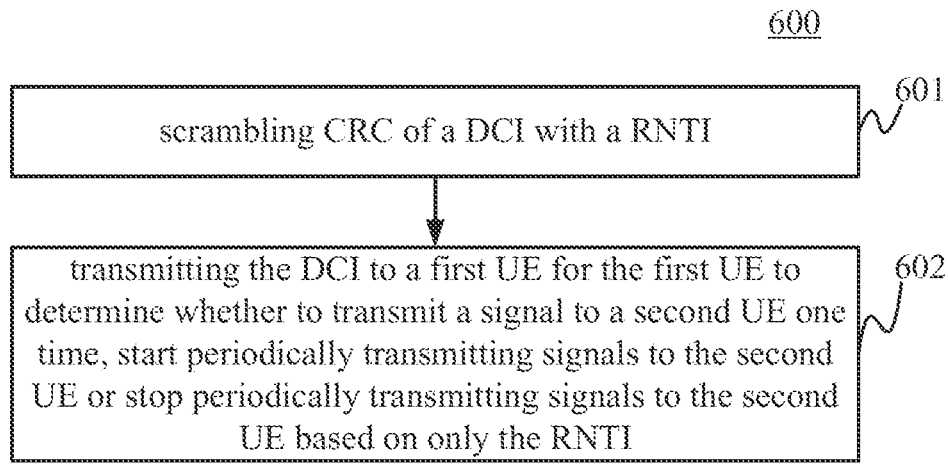
FIG. 6 illustrates a flowchart of a wireless communication method performed by an eNB according to an embodiment of the present disclosure.

Accordingly, FIG. 6 illustrates a flowchart of a wireless communication method 600 performed by an eNB according to an embodiment of the present disclosure. The wireless communication method 600 can comprise a step 601 of scrambling CRC of a DCI with a RNTI, and a step 602 of transmitting the DCI to a first UE for the first UE to determine whether to transmit a signal to a second UE one time, start periodically transmitting signals to the second UE or stop periodically transmitting signals to the second UE based on only the RNTI, wherein the DCI is in DCI format 5. In this embodiment, the first UE (transmitting UE) can determine whether to perform one time transmission, activate SPS transmission or deactivate SPS transmission purely based on the RNTI that has been used to scramble the CRC of the DCI without modifying the format of the DCI. Therefore, the same DCI format can be used for SPS transmission and non-SPS transmission.

An embodiment of the present disclosure also provides an eNB for performing the above method 600, which comprises: circuitry operative to scramble CRC of a DCI with a RNTI; and a transmitter operative to transmit the DCI to a first UE for the first UE to determine whether to transmit a signal to a second UE one time, start periodically transmitting signals to the second UE or stop periodically transmitting signals to the second UE based on only the RNTI, wherein the DCI is in DCI format 5. The block diagram of the eNB in this embodiment can refer to the structure shown in FIG. 2.

Figure 7:
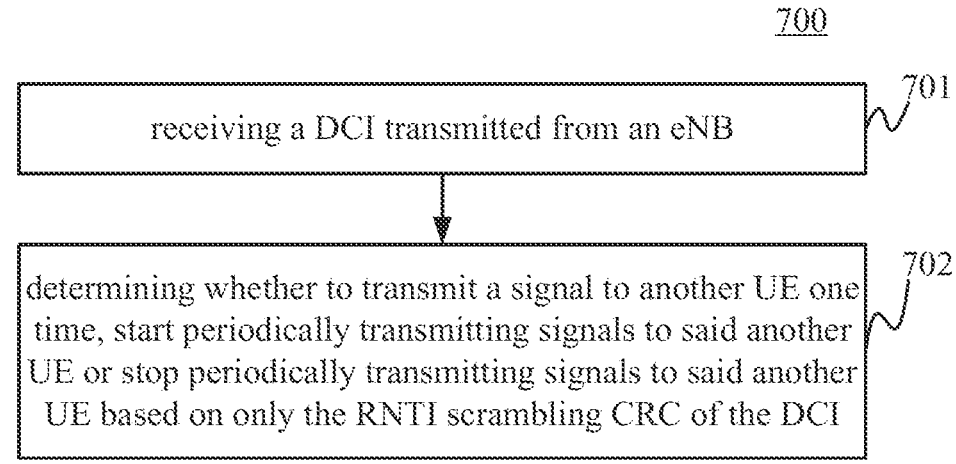
FIG. 7 illustrates a flowchart of a wireless communication method performed by a UE according to an embodiment of the present disclosure.

FIG. 7 illustrates a flowchart of a wireless communication method 700 performed by a UE according to an embodiment of the present disclosure. The wireless communication method 700 can comprise a step 701 of receiving a DCI transmitted from an eNB, and a step 702 of determining whether to transmit a signal to another UE one time, start periodically transmitting signals to said another UE or stop periodically transmitting signals to said another UE based on only the RNTI scrambling CRC of the DCI, wherein the DCI is in DCI format 5.

An embodiment of the present disclosure also provides a UE for performing the above method 700, which comprises: a receiver operative to receive a DCI transmitted from an eNB; and circuitry operative to determine whether to transmit a signal to another UE one time, start periodically transmitting signals to said another UE or stop periodically transmitting signals to said another UE based on only the RNTI scrambling CRC of the DCI, wherein the DCI is in DCI format 5. The block diagram of the UE in this embodiment can refer to the structure shown in FIG. 4 except that the transmitter 402 is replaced by the above circuitry.

In another embodiment, a new field for SPS activation/deactivation can be added in DCI format 5; and the DCI format 0/1A is also added with the new field, or all legacy fields in DCI format 0/1A are automatically enabled regardless of FDD/TDD, downlink/uplink, CA/non-CA (carrier aggregation) when V2X or D2D SPS is enabled in order to make the size of DCI format 0/1A the same as that of the modified DCI format 5, for example, the "CFI" field (3 bits) regardless of CA or non-CA, the "UL index" field (2 bits) regardless of FDD or TDD, and the "Downlink Assignment Index" (2 bits) regardless of FDD or TDD. If the DCI format 0/1A size is still not large enough to be aligned with the modified DCI format 5, padding bits can be added. In this manner, the sizes of the DCI format 0/1A and the DCI format 5 after being modified are still kept the same, which will not increase the blind decoding times.

Figure 8:
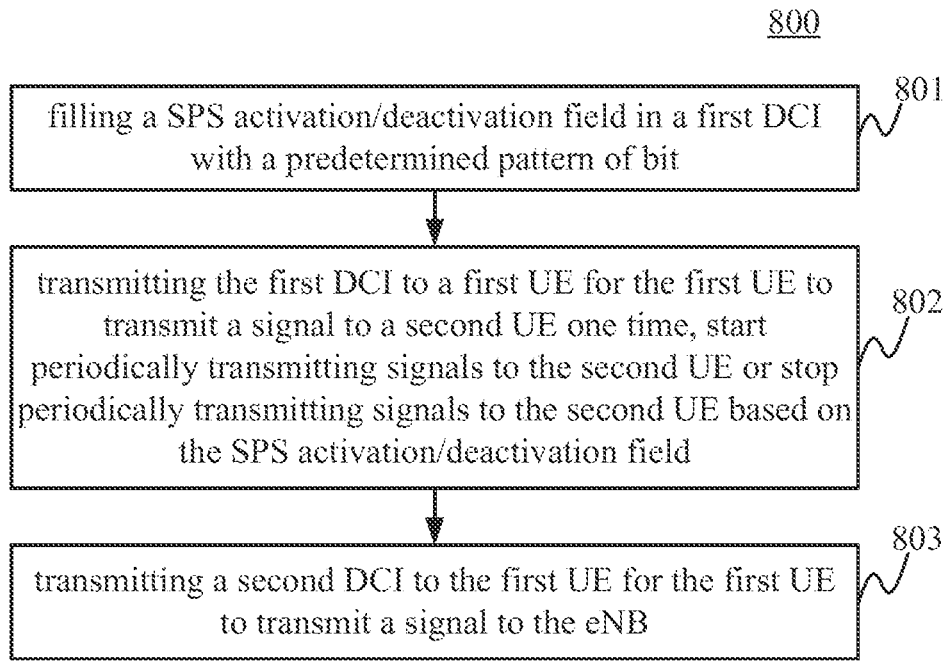
FIG. 8 illustrates a flowchart of a wireless communication method performed by an eNB according to an embodiment of the present disclosure.

Accordingly, FIG. 8 illustrates a flowchart of a wireless communication method 800 performed by an eNB according to an embodiment of the present disclosure. The wireless communication method 800 can comprise: a step 801 of filling a SPS activation/deactivation field in a first DCI with a predetermined pattern of bits; a step 802 of transmitting the first DCI to a first UE for the first UE to transmit a signal to a second UE one time, start periodically transmitting signals to the second UE or stop periodically transmitting signals to the second UE based on the SPS activation/deactivation field, wherein the first DCI is in a format formed by additionally adding the SPS activation/deactivation field to DCI format 5; and a step 803 of transmitting a second DCI to the first UE for the first UE to transmit a signal to the eNB, wherein the second DCI is in DCI format 0/1A with all legacy fields being enabled or in a format formed by additionally adding the same field as the one added to the DCI format 5 to the DCI format 0/1A, such that the size of the first DCI is the same as that of the second DCI. It is noted that the above steps in the method 800 are not necessarily performed in the above indicated order. For example, the step 803 can be performed before the steps 801 and 802.

In the method 800, the first DCI is in a modified DCI format 5 by adding a SPS activation/deactivation field and used for D2D or V2X. The SPS activation/deactivation field in the modified DCI format 5 indicates whether the first UE (transmitting UE) should perform a one-time transmission to the second UE (receiving UE), start SPS transmission to the second UE or stop the SPS transmission to the second UE. The second DCI is used for legacy wireless communication (i.e. the communication between the eNB and UEs), and is in a modified DCI format 0/1A by adding the same field as the SPS activation/deactivation field added to the DCI format 5, or in the original DCI format 0/1A with all legacy fields being enabled, such that the first DCI and the second DCI have the same size.

Table 6 illustrates that a new field used for SPS activation/deactivation is added in both DCI format 0/1A and DCI format 5. In such a manner, DCI format 0/1A still keeps the same size as DCI format 5.

TABLE 6

| DCI format 0 | DCI format 1A | DCI format 5 |
|---|---|---|
| Carrier indicator | Carrier indicator | Resource for PSCCH |
| Flag for format0/format1A differentiation | Flag for format0/format1A differentiation | TPC command for PSCCH and PSSCH |
| Hopping flag/RA Type 1 MSB | Localized/Distributed VRB assignment flag | Frequency hopping flag |
| Resource block assignment and hopping resource allocation | Resource block assignment | Resource block assignment and hopping resource allocation |
| Modulation and coding scheme and redundancy version | Modulation and coding scheme | Time resource pattern |
| New data indicator | HARQ process number | V2X SPS activation/deactivation |
| TPC command for scheduled PUSCH | New data indicator | |
| Cyclic shift for DM RS and OCC index | Redundancy version | |
| UL index or Downlink Assignment Index (DAI) | TPC command for PUCCH | |
| CSI request | Downlink Assignment Index | |
| SRS request | SRS request | |
| Resource allocation type | HARQ-ACK resource offset | |
| V2X SPS activation/deactivation | V2X SPS activation/deactivation | |

Table 7 illustrates that DCI format 0/1A size is maximized by enabling all fields regardless of FDD/TDD, downlink/uplink and CA/non-CA, and a new field is added in DCI format 5. In such a manner, the two Das can also keep the same size so that blind decoding times are not increased.

TABLE 7

| DCI format 0 | | DCI format 1A | | DCI format 5 |
|---|---|---|---|---|
| Carrier indicator | enabled | Carrier indicator | enabled | Resource for PSCCH |
| Flag for format0/format1A differentiation | enabled | Flag for format0/format1A differentiation | enabled | TPC command for PSCCH and PSSCH |
| Hopping flag/RA Type 1 MSB | enabled | Localized/Distributed VRB assignment flag | enabled | Frequency hopping flag |
| Resource block assignment and hopping resource allocation | enabled | Resource block assignment | enabled | Resource block assignment and hopping resource allocation |
| Modulation and coding scheme and redundancy version | enabled | Modulation and coding scheme | enabled | Time resource pattern |
| New data indicator | enabled | HARQ process number | enabled | V2X SPS activation/deactivation |
| TPC command for scheduled PUSCH | enabled | New data indicator | enabled | |
| Cyclic shift for DM RS and OCC index | enabled | Redundancy version | enabled | |
| UL index or Downlink Assignment Index (DAI) | enabled | TPC command for PUCCH | enabled | |
| CSI request | enabled | Downlink Assignment Index | enabled | |
| SRS request | enabled | SRS request | enabled | |
| Resource allocation type | enabled | HARQ-ACK resource offset | enabled | |

An embodiment of the present disclosure also provides an eNB for performing the above method 800, which comprises: circuitry operative to fill a SPS activation/deactivation field in a first DCI with a predetermined pattern of bits; and a transmitter operative to transmit the first DCI to a first UE for the first UE to transmit a signal to a second UE one time, start periodically transmitting signals to the second UE or stop periodically transmitting signals to the second UE based on the SPS activation/deactivation field, wherein the first DCI is in a format formed by additionally adding the SPS activation/deactivation field to DCI format 5; the transmitter is also operative to transmit a second DCI to the first UE for the first UE to transmit a signal to the eNB; and the second DCI is in DCI format 0/1A with all legacy fields being enabled or in a format formed by additionally adding the same field as the one added to the DCI format 5 to the DCI format 0/1A, such that the size of the first DCI is the same as that of the second DCI. The block diagram of the eNB in this embodiment can refer to the structure shown in FIG. 2.

Figure 9:
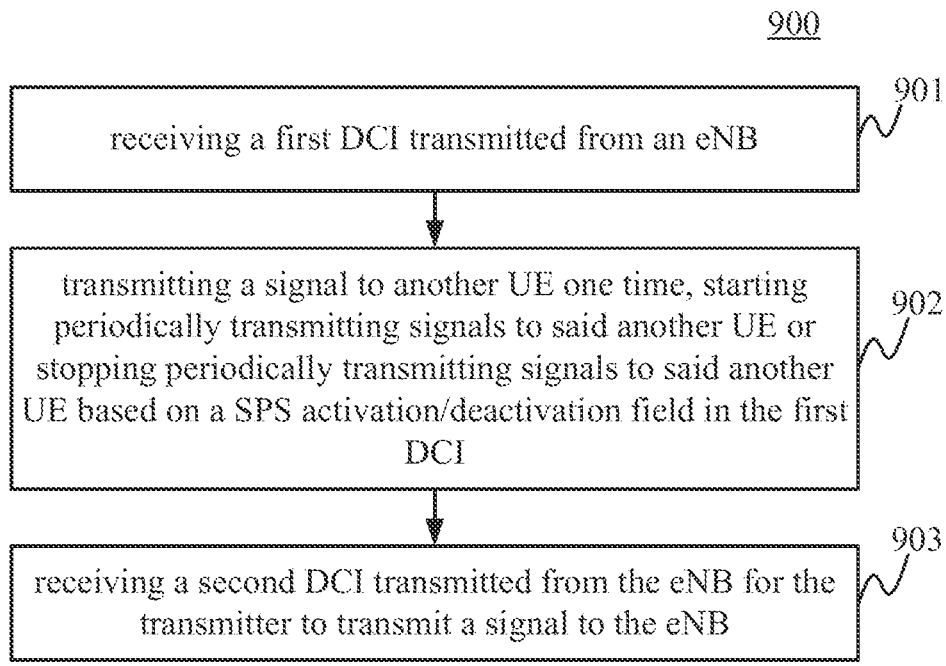
FIG. 9 illustrates a flowchart of a wireless communication method performed by a UE according to an embodiment of the present disclosure.

For the transmitting UE side, FIG. 9 illustrates a flowchart of a wireless communication method 900 performed by a UE according to an embodiment of the present disclosure. The wireless communication method 900 can comprise: a step 901 of receiving a first DCI transmitted from an eNB; a step 902 of transmitting a signal to another UE one time, starting periodically transmitting signals to said another UE or stopping periodically transmitting signals to said another UE based on a SPS activation/deactivation field in the first DCI, wherein the first DCI is in a format formed by additionally adding the SPS activation/deactivation field to DCI format 5; and a step 903 of receiving a second DCI transmitted from the eNB for the transmitter to transmit a signal to the eNB, wherein the second DCI is in DCI format 0/1A with all legacy fields being enabled or in a format formed by additionally adding the same field as the one added to the DCI format 5 to the DCI format 0/1A, such that the size of the first DCI is the same as that of the second DCI.

An embodiment of the present disclosure also provides a UE for performing the above method 900, which comprises: a receiver operative to receive a first DCI transmitted from an eNB; and a transmitter operative to transmit a signal to another UE one time, start periodically transmitting signals to said another UE or stop periodically transmitting signals to said another UE based on a SPS activation/deactivation field in the first DCI, wherein the first DCI is in a format formed by additionally adding the SPS activation/deactivation field to DCI format 5; the receiver is also operative to receive a second DCI transmitted from the eNB for the transmitter to transmit a signal to the eNB; and the second DCI is in DCI format 0/1A with all legacy fields being enabled or in a format formed by additionally adding the same field as the one added to the DCI format 5 to the DCI format 0/1A, such that the size of the first DCI is the same as that of the second DCI. The block diagram of the UE in this embodiment can refer to the structure shown in FIG. 4.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected.

Furthermore, in a range not departing from the content of the disclosure, the constituent elements of the above-described embodiments may be arbitrarily combined.

Embodiments of the present disclosure can at least provide the following subject matters.

1. An eNode B (eNB) comprising:
circuitry operative to fill a semi-static scheduling (SPS) activation/deactivation field in a downlink control information (DCI) with a predetermined pattern of bits; and
a transmitter operative to transmit the DCI to a first user equipment (UE) for the first UE to start periodically transmitting signals to a second UE or stop periodically transmitting signals to the second UE based on the SPS activation/deactivation field,
wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

2. The eNode B according to 1, wherein
all bits of all fields in the DCI format 5 are adopted as the SPS activation/deactivation field; and
the radio network temporary identity (RNTI) for scrambling cyclic redundancy check (CRC) of the DCI in the SPS format is the same as that for scrambling CRC of a DCI in the DCI format 5.

3. The eNode B according to 1 or 2, further comprising:
a receiver operative to receive signals from the first UE, wherein the receiver does not receive sidelink buffer status report (BSR) message or scheduling request (SR) for sidelink from the first UE when the first UE periodically transmits signals to the second UE.

4. An eNode B (eNB) comprising:
circuitry operative to scramble cyclic redundancy check (CRC) of a downlink control information (DCI) with a radio network temporary identity (RNTI); and
a transmitter operative to transmit the DCI to a first user equipment (UE) for the first UE to determine whether to transmit a signal to a second UE one time, start periodically transmitting signals to the second UE or stop periodically transmitting signals to the second UE based on only the RNTI,
wherein the DCI is in DCI format 5.

5. An eNode B (eNB) comprising:
circuitry operative to fill a semi-static scheduling (SPS) activation/deactivation field in a first downlink control information (DCI) with a predetermined pattern of bits; and
a transmitter operative to transmit the first DCI to a first user equipment (UE) for the first UE to transmit a signal to a second UE one time, start periodically transmitting signals to the second UE or stop periodically transmitting signals to the second UE based on the SPS activation/deactivation field,
wherein the first DCI is in a format formed by additionally adding the SPS activation/deactivation field to DCI format 5;
the transmitter is also operative to transmit a second DCI to the first UE for the first UE to transmit a signal to the eNB; and
the second DCI is in DCI format 0/1A with all legacy fields being enabled or in a format formed by additionally adding the same field as the one added to the DCI format 5 to the DCI format 0/1A, such that the size of the first DCI is the same as that of the second DCI.

6. A user equipment (UE) comprising:
a receiver operative to receive a downlink control information (DCI) transmitted from an eNode B (eNB);
a transmitter operative to start periodically transmitting signals to another UE or stop periodically transmitting signals to said another UE based on a SPS activation/deactivation field in the DCI,
wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

7. The user equipment according to 6, wherein
all bits of all fields in the DCI format 5 are adopted as the SPS activation/deactivation field; and
the radio network temporary identity (RNTI) for scrambling cyclic redundancy check (CRC) of the DCI in the SPS format is the same as that for scrambling CRC of a DCI in the DCI format 5.

8. The user equipment according to 6 or 7, wherein
the transmitter does not transmit sidelink buffer status report (BSR) message or scheduling request (SR) for sidelink to the eNB when periodically transmitting signals to said another UE.

9. A user equipment (UE) comprising:
a receiver operative to receive a downlink control information (DCI) transmitted from an eNode B (eNB); and
circuitry operative to determine whether to transmit a signal to another UE one time, start periodically transmitting signals to said another UE or stop periodically transmitting signals to said another UE based on only the radio network temporary identity (RNTI) scrambling cyclic redundancy check (CRC) of the DCI;
wherein the DCI is in DCI format 5.

10. A user equipment (UE) comprising:
a receiver operative to receive a first downlink control information (DCI) transmitted from an eNode B (eNB); and
a transmitter operative to transmit a signal to another UE one time, start periodically transmitting signals to said another UE or stop periodically transmitting signals to said another UE based on a SPS activation/deactivation field in the first DCI,
wherein the first DCI is in a format formed by additionally adding the SPS activation/deactivation field to DCI format 5;
the receiver is also operative to receive a second DCI transmitted from the eNB for the transmitter to transmit a signal to the eNB; and
the second DCI is in DCI format 0/1A with all legacy fields being enabled or in a format formed by additionally adding the same field as the one added to the DCI format to the DCI format 0/1A, such that the size of the first DCI is the same as that of the second DCI.

11. A wireless communication method performed by an eNode B (eNB), comprising:

filling a semi-static scheduling (SPS) activation/deactivation field in a downlink control information (DCI) with a predetermined pattern of bits; and transmitting the DCI to a first user equipment (UE) for the first UE to start periodically transmitting signals to a second UE or stop periodically transmitting signals to the second UE based on the SPS activation/deactivation field, wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

12. The wireless communication method according to 11, wherein all bits of all fields in the DCI format 5 are adopted as the SPS activation/deactivation field; and the radio network temporary identity (RNTI) for scrambling cyclic redundancy check (CRC) of the DCI in the SPS format is the same as that for scrambling CRC of a DCI in the DCI format 5.

13. A wireless communication method performed by an eNode B (eNB), comprising:

scrambling cyclic redundancy check (CRC) of a downlink control information (DCI) with a radio network temporary identity (RNTI); and transmitting the DCI to a first user equipment (UE) for the first UE to determine whether to transmit a signal to a second UE one time, start periodically transmitting signals to the second UE or stop periodically transmitting signals to the second UE based on only the RNTI, wherein the DCI is in DCI format 5.

14. A wireless communication method performed by an eNode B (eNB), comprising:

filling a semi-static scheduling (SPS) activation/deactivation field in a first downlink control information (DCI) with a predetermined pattern of bits;

transmitting the first DCI to a first user equipment (UE) for the first UE to transmit a signal to a second UE one time, start periodically transmitting signals to the second UE or stop periodically transmitting signals to the second UE based on the SPS activation/deactivation field, wherein the first DCI is in a format formed by additionally adding the SPS activation/deactivation field to DCI format 5; and transmitting a second DCI to the first UE for the first UE to transmit a signal to the eNB, wherein the second DCI is in DCI format 0/1A with all legacy fields being enabled or in a format formed by additionally adding the same field as the one added to the DCI format 5 to the DCI format 0/1A, such that the size of the first DCI is the same as that of the second DCI.

15. A wireless communication method performed by a user equipment (UE), comprising:

receiving a downlink control information (DCI) transmitted from an eNode B (eNB);

starting periodically transmitting signals to another UE or stopping periodically transmitting signals to said another UE based on a SPS activation/deactivation field in the DCI, wherein the DCI is in a SPS format formed by adopting part or all bits of at least one field of DCI format 5 as the SPS activation/deactivation field, and information supposed to be transmitted in the at least one field is indicated with the assistance of or by radio resource control (RRC) or media access control (MAC) signaling.

16. The wireless communication method according to 15, wherein all bits of all fields in the DCI format 5 are adopted as the SPS activation/deactivation field; and the radio network temporary identity (RNTI) for scrambling cyclic redundancy check (CRC) of the DCI in the SPS format is the same as that for scrambling CRC of a DCI in the DCI format 5.

17. A wireless communication method performed by a user equipment (UE), comprising:

receiving a downlink control information (DCI) transmitted from an eNode B (eNB); and determining whether to transmit a signal to another UE one time, start periodically transmitting signals to said another UE or stop periodically transmitting signals to said another UE based on only the radio network temporary identity (RNTI) scrambling cyclic redundancy check (CRC) of the DCI;

wherein the DCI is in DCI format 5.

18. A wireless communication method performed by a user equipment (UE), comprising:

receiving a first downlink control information (DCI) transmitted from an eNode B (eNB);

transmitting a signal to another UE one time, starting periodically transmitting signals to said another UE or stopping periodically transmitting signals to said another UE based on a SPS activation/deactivation field in the first DCI, wherein the first DCI is in a format formed by additionally adding the SPS activation/deactivation field to DCI format 5; and receiving a second DCI transmitted from the eNB for the transmitter to transmit a signal to the eNB, wherein the second DCI is in DCI format 0/1A with all legacy fields being enabled or in a format formed by additionally adding the same field as the one added to the DCI format 5 to the DCI format 0/1A, such that the size of the first DCI is the same as that of the second DCI.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

The invention claimed is:

1. A base station comprising:

circuitry, which, in operation, generates a first downlink control information (DCI) and a second DCI, a transmitter, which, in operation, transmits the first DCI and the second DCI to a first user equipment, wherein the first DCI includes an activation or release field used for activation or release of Semi Persistent Scheduling (SPS) in addition to all fields of the second DCI, the first DCI being transmitted by the base station separately from the second DCI, the second DCI being used for a communication between the first user equipment and a second user equipment; and wherein the activation or release field indicates to transmit semi-persistently scheduled data from the first user equipment to the second user equipment, or to terminate semi-persistently scheduled data, wherein the first DCI is set to a same size as a third DCI by using padding bits, the third DCI being used for a communication between the first user equipment and the base station.

2. The base station according to claim 1, wherein a cyclic redundancy check (CRC) of the first DCI is scrambled with a Semi Persistent Scheduling (SPS) specific radio network temporary identity (RNTI).

3. The base station according to claim 1, wherein the first DCI includes a time resource field indicating a time resource from a subset determined by a radio resource control (RRC) signaling.

4. A communication method performed by a base station, the communication method comprising:
- generating a first downlink control information (DCI) and a second DCI,
- transmitting the first DCI and the second DCI to a first user equipment,
- wherein the first DCI includes an activation or release field used for activation or release of Semi Persistent Scheduling (SPS) in addition to all fields of the second DCI, the first DCI being transmitted by the base station separately from the second DCI, the second DCI being used for a communication between the first user equipment and a second user equipment; and
- wherein the activation or release field indicates to transmit semi-persistently scheduled data from the first user equipment to the second user equipment, or to terminate semi-persistently scheduled data,
- wherein the first DCI is set to a same size as a third DCI by using padding bits, the third DCI being used for a communication between the first user equipment and the base station.

5. The communication method according to claim 4, wherein a cyclic redundancy check (CRC) of the first DCI is scrambled with a Semi Persistent Scheduling (SPS) specific radio network temporary identity (RNTI).

6. The communication method according to claim 4, wherein the first DCI includes a time resource field indicating a time resource from a subset determined by a radio resource control (RRC) signaling.

* * * * *